(12) United States Patent
Hüner et al.

(10) Patent No.: US 6,303,545 B1
(45) Date of Patent: Oct. 16, 2001

(54) SOLID LUBRICANTS WITH A TIN SULPHIDE AND CARBON BASE

(75) Inventors: Ronald Hüner, Villach; Bernhard Melcher, Klagenfurt; Roman Milczarek, Arnoldstein; Herbert Kienleitner, Riegersdorf, all of (AT)

(73) Assignee: Chemetall Ges. m.b.H., Vienna (AU)

( * ) Notice: Subject to any disclaimer, the term of this patent is extended or adjusted under 35 U.S.C. 154(b) by 0 days.

(21) Appl. No.: 09/673,004

(22) PCT Filed: Oct. 6, 2000

(86) PCT No.: PCT/EP99/02426

§ 371 Date: Nov. 1, 2000

§ 102(e) Date: Nov. 1, 2000

(87) PCT Pub. No.: WO99/52997

PCT Pub. Date: Oct. 21, 1999

(30) Foreign Application Priority Data

Apr. 9, 1998 (DE) .............................................. 198 15 992

(51) Int. Cl.$^7$ ...................... C10M 103/02; C10M 103/04
(52) U.S. Cl. .............................................................. 508/105
(58) Field of Search ............................................. 508/105

(56) References Cited

U.S. PATENT DOCUMENTS

| | | | | |
|---|---|---|---|---|
| 3,619,430 | * | 11/1971 | Yokohama et al. | 508/105 |
| 4,000,981 | * | 1/1977 | Sugafuji et al. | 508/105 |
| 5,958,846 | * | 9/1999 | Geringer | 508/105 |
| 6,110,268 | * | 8/2000 | Gross et al. | 508/105 |

* cited by examiner

*Primary Examiner*—Jacqueline V. Howard
(74) *Attorney, Agent, or Firm*—Fish & Associates, LLP; Robert D. Fish

(57) ABSTRACT

The invention relates to tin sulfide- and carbon-based solid lubricants and solid lubricant combinations, methods for the production thereof as well as their use in friction liner mixtures and friction liners such as brake or clutch liners.

20 Claims, No Drawings

SOLID LUBRICANTS WITH A TIN SULPHIDE AND CARBON BASE

The present invention relates to solid lubricants and solid lubricant combinations based on tin sulfide and carbon, a method for their production as well as their use in friction lining mixtures and friction linings such as brake or clutch linings.

In addition to the classical use as a solid lubricant, in which a lubricating film is formed between two surfaces which are to slide relative to one another, compounds such as molybdenum sulfide have also been used in another tribological field, namely in the manufacture of friction elements such as brake pads, brake shoes or brake- and clutch linings. The purpose of these friction elements is, however, not to avoid, but rather to generate friction. For this reason, the goal in implementing solid lubricants in such friction elements is not the reduction of friction, but rather the stabilization of the frictional course. This stabilization brings with it a reduction of the abrasive processes, having a positive influence on the attrition and fibrational behavior.

In addition to the Molybdenum Sulfide mentioned at the mentioned at the outset, graphite is certainly the most well known special solid lubricant used in friction linings.

However, other further solid lubricants for friction linings have been known for a long time based on graphites, sulfides as well as combinations of these compounds with fluorides and phosphates. A well-known and prevalent solid lubricant is for example lead sulfide. Due to increasing ecological concerns with respect to heavy metals and the associated efforts to cut back their use, lead sulfide is available to an ever restricted degree. Antimony Sulfide is a further representative from the group of metal sulfides, and has found prevalent use in friction linings.

In this context, U.S. Pat. No. 3,965,016 describes the use of antimony sulfides, in particular based on oils and fats, as lubricant additives by which the high-pressure characteristics and the attrition behavior of these materials is drastically improved. Furthermore, a solid lubricant combination is known for example in German patent DE 35 13 031, consisting of graphite, tin sulfide, antimony(III)-sulfide as well as an earth alkali metal phosphate or another inorganic metal phosphate as a solid lubricant. According to DE 35 13 031, friction linings manufactured by using this solid lubricant combination exhibit a relatively low attrition index and a frictional index which fluctuates within a narrow range. Furthermore, it is intended to avoid a forced transmission of liner material onto the brake disks. Seen from an ecological and toxological standpoint, the use of solid lubricants based on antimony sulfide in friction linings is, however, as of recently viesed as questionable. Irrespective of the oxidation state of the metal, the heat generated by the frictional process causes antimony sulfide to react with oxygen in the air to antimony oxide. The latter, however, has recently been suspected of having a carcinogenic effect and for this reason the use of antimony sulfide in friction linings is not recommended.

The goal of the present invention is therefore to provide a solid lubricant as well as a combination of solid lubricants exhibiting comparable or even better tribological characteristics than known solid lubricants of the prior art and combinations derived thereof, yet which are free from ecologically or toxologically critical compounds.

The inventors surprisingly found that such solid lubricants are obtainable by reacting metallic tin in finely dispersed form with sulfur and carbon in the reaction batch under inert gas or under air atmosphere at temperatures of 200 to 1500° C., preferably 800–1200° C. for 0.1 to 6 hours, preferably 40 to 80 minutes, wherein sulfur is used in at least a stoichiometric amount, calculated from sole formation of $SnS_2$ and carbon is used in an amount of 0.5 to 20 wt. % a relative to the total weight of the reaction batch.

Surprisingly, the method found here makes possible a hitherto unknown alternative for the manufacture of tin sulfides containing predominantly tin(IV)-sulfide.

In the method according to the invention the carbon obviously has the effect of Amoninum chloride or an effect corresponding to that of other known acidic catalysts, which is documented by the formation of large quantities of $SnS_2$ in the solid lubricant obtained. The carbon remains in the tin sulfide matrix generated as the reaction product and, according to the studies of the inventors, is present in this in a statistically dispersed manner.

The tin sulfides forming the tin sulfide matrix can be represented as a non-charged compound in which internal charges sum to a total external charge of zero of the formula $$Sn_xS_y$$

as a mixture of tin sulfides of the formulas $SnS$, $Sn_2S_3$ and $SnS_2$, wherein the indices in the formula values are taken to be x=1–5 and y=5–10.

The studies performed by the inventors have furthermore shown that the formation of single sulfides is dependent on the exact reaction conditions. Normally, the solid lubricant obtainable according to the inventive process contains about 50–90 wt. % tin(IV)-sultide and 10–50 wt. % other tin sulfides, in particular Sn(II)-sulfide with respect to the total amount of material of the tin sulfides contained therein. Here, the proportion of carbon is about 0.5–20 wt. % relative to the total weight of the solid lubricant.

In the inventive method for production of the solid lubricant, metallic tin in finely dispersed form is first mixed with sulfur and carbon. Here, the sulfur is used in at least a stoichiometric amount calculated for the complete conversion of the tin to $SnS_2$. Preferably, a slight stoichiometric excess of sulfur of up to 5%, calculated for the formation of $SnS_2$, is used. The carbon is used in an amount of 0.5 to 20 wt. % relative to the total weight of the reaction batch. After mixing, the reaction mixture is reacted under inert gas or under air atmosphere at temperatures of 200° to 1500° C. for 0.1 to 6 hours. After completion of the reaction, the product obtained is allowed to cool and is subsequently ground.

According to a preferred embodiment of the method according to the invention, the carbon is used in an amount of 2–8 wt. % and particularly in an amount of 5 wt. % relative to the weight of the finished reaction mixture.

According to another preferred embodiment of the present invention, the carbon is used in the reaction batch in the form of graphite. The graphite can be of natural as well as synthetic origin. It is, however, also possible to use other modifications of carbon such as for example carbon black.

The tin sulfide reaction product obtainable according to the inventive method can generally be used as a solid lubricant as well as a special additive of friction liner mixtures. In the use as an additive for friction liner mixtures, the solid lubricants containing tin sulfide and graphite are used in an amount of 0.5% to 15 wt. %, preferably in an amount of 5 wt. %. The friction liner mixtures obtained in this way find application primarily in friction liners, preferably in resin-bound friction liners and particularly in friction liners such as clutch or brake liners, The positive influence on the attrition behavior of such friction liners, which positive influence is achieved with the inventive solid lubricant, is comparable to or even better than the effect in this respect of antimony(III)-oxide. Furthermore, advantageous characteristics such as for example low noise generation and a uniformly high friction index are a consequence of the good attrition behavior achieved.

Not only can the solid lubricant obtainable according to the method described here be used as a sole additive to friction liner mixtures but, according to a further modification of the present invention, it can also be used for the production of a solid lubricant combination. The friction liners made using this solid lubricant combination also have an at least equivalent attrition behavior as the friction liners made with the help of combinations of solid lubricants containing antimony sulfide.

The combination of solid lubricants of the present invention is made by providing 2 to 50 wt. % of the tin sulfide based solid lubricant described above with 2 to 40 wt. % graphite, 2 to 40 wt. % zinc sulfide, 2 to 30 wt. % tin(II)-sulfid, 1 to 5 wt. % free sulfur as well as 2 to 40 wt. % of metal phosphate or a metal phosphate in an intensive mixer, for example in an asymmetrically moved mixer, each in finely dispersed form, and subsequently mixing the components therein with one another. After the mixing procedure, the solid lubricant combination is ground in order to obtain a relatively uniform particle size. The particle size following grinding should lie with a range of 5 to 45 μm in order to ensure a sufficient mixability with the remaining components in the use as an additive in the mixing process.

In making the solid lubricant combination, all earth alkali metal phosphates and metal phosphates which are usable as solid lubricants can in principal be used. Preferably, calcium phosphate, magnesium phosphate, aluminum phosphate, iron phosphate or zinc pyrophosphate is used. Furthermore, mixtures of at least two of these metals or earth alkali metal phosphates can also be used.

As already mentioned above, this solid lubricant combination obtained in this way also finds application in the production of friction liner mixtures. Here, it is used in an amount of 0.5 to 15.0 wt. % relative to the total weight of the friction liner mixture. These mixtures can also themselves then be processed into friction liners, particularly into friction liners such as clutch or brake liners.

The present invention is now described in more detail according to the following non-limiting examples.

EXAMPLE 1
Prodcution Example 119 g of tin powder were mixed with 71 g sulfur, corresponding to a stoichiometric excess of 10% with respect to the formation of $SnS_2$, as well as with 9 g of graphite (corresponding to 5 wt. % of the end reaction mixture). The reaction batch was subsequently reacted in a conventional box-type furnace at 200–800° C. under protective gas atmosphere for 6 hours. After cooling, the reaction product was ground and was investigated as to its chemical composition.

The analysis of this material made in this way as an illustration of the present method showed that the molar fraction of tin(IV)-sulfide in the tin sulfide matrix generated was about 70 wt. % and the remaining 30 wt. % of the sulfurous fraction was present predominantly as Sn(II)-sulfide.

This carbon-containing tin sulfide obtainable according to the inventive method was subsequently worked into friction liner mixtures and their tribological characteristics were investigated as described in following example 2.

EXAMPLE 2
Application of the Solid Lubricant According to the Invention

To compare the graphite-containing, tin sulfide-based solid lubricant obtainable according to the above method with known solid lubricants, typical recipes for brake pad linings were used (Table 1). The recipes without solid lubricant, also investigated as a reference in the series of tests, were first mixed in a plowshare mixer with a knife head. These were then subsequently pressed into disk brake linings conventional for automobiles in a pressure- and temperature-regulated laboratory press. The solid lubricants to be compared were mixed in identical proportions into the respective pre-mix between these two steps in order to make the solid lubricant-containing specimens. The test linings made in this way were then tested on a Krauss test stand.

TABLE 1

Composition of the solid lubricant-containing test recipes for brake linings

| Component | Recipe A (wt. . - %) | Recipe B (wt. . - %) |
|---|---|---|
| Steel Wool | 10 | 10 |
| Metal Powder | 15 | 15 |
| Fibers | 8.7 | 9 |
| Organic Fraction | 11 | 11 |
| Frictional Materials | 9 | 9 |
| Filler Materials | 20 | 20 |
| Graphite | 20.3 | 20 |
| Solid Lubricant | 6 | 6 |

In the subsequent test program, special attention was paid to the attrition characteristics at high loads, since under these conditions the advantageous characteristics of the carbon-containing tin sulfide are especially evident. The test program comprised specifically 1.) a brake-in period with 100 stops to condition the surfaces,
2.) a test to determine the influence of temperature, consisting of 6 cycles of 10 stops each in series at a brake-liner temperature of 100, 200 or 400° C. at a speed corresponding to 140 km/h and a pressure of 20 bar.

The weight reduction in grams per lining was determined in order to evaluate the attrition behavior. To facilitate comparability, the abrasion values given in tables 2 and 3 are in respect to the weight reduction at 100° C. of the corresponding reference lining (lining 0) comprising the same respective composition except for the fact that the solid lubricant is omitted.

The effect of the tin sulfide according to the invention in comparison to conventional tin(II)-sultide was investigated in a first series of tests. To this end, the graphite-containing tin sulfide obtained in the production example or commerically common tin(II)-sulfide was worked into the above test recipe A and the attrition behavior of the brake linings made with the recipes was subsequently investigated. In order to avoid skewing of the test results by a different graphite content in the linings (the amount of graphite in lining 1a was raised by 0.3 wt. % while keeping the rest of the composition the same due to the presence of graphite in the solid lubricant which had been obtained in the above production example), the corresponding amount of graphite was added to the Sn(II)-sulfide-containing mixture 1.

In the previously described test, the following values were obtained for the attrition (table 2).

TABLE 2

| Attrition | 100° C. | 200° C. | 400° C. |
|---|---|---|---|
| Lining 0 | 1 | 2.2 | 4.5 |
| Lining 1 | 0.67 | 1.3 | 3.5 |
| Lining 1a | 0.43 | 0.68 | 2.4 |

In light of these values it can be seen that the addition of the solid lubricant according to the invention markedly reduces the attrition of friction linings as compared with friction linings made using conventional Sn(II)-sulfide.

In a second series of tests the influence of the graphite-containing tin sulfide on the attrition behavior of friction linings was compared to that of antimony(III)-sulfide. To this end, recipe B, which contained 6 wt. % of respective pure $Sb_2S_3$ or the material synthesized in the production example 1, were processed to the corresponding test linings 1 and 2. During the investigation of these test linings, the values given in table 3 were obtained.

TABLE 3

| Attrition | 100° C. | 200° C. | 400° C. |
|---|---|---|---|
| Lining 0 | 1 | 1.4 | 5.9 |
| Lining 1 | 0.60 | 1.3 | 2.4 |
| Lining 2 | 0.63 | 1.0 | 1.9 |

This comparison shows that at low temperatures nearly identical attrition behavior is obtained by addition of the solid lubricant according to the invention (lining 2) as by use of $Sb_2S_3$ (lining 1). However, at higher temperatures the graphite-containing tin sulfide even effects markedly improved attrition characteristics. According to the results obtained here as well as in view of a hitherto unknown toxological potential, the solid lubricant according to the invention based on tin sulfide should find application as a tribological replacement material for antimony sulfide.

What is claimed is:

1. A method of producing a solid lubricant, comprising:
   forming a reaction mixture comprising metallic tin, sulfur and carbon;
   wherein the sulfur is present in the reaction mixture in an amount greater than a stoichiometric amount based on a formation of $SnS_2$, and wherein the carbon is present in the mixture in an amount of 0.5 wt % to 20 wt % of the mixture; and
   heating the mixture to a temperature of between 200° C. to 1500° C. to form a reaction product.

2. The method of claim 1 wherein the metallic tin is finely dispersed in the mixture.

3. The method of claim 1 wherein the sulfur is present in the mixture in an amount of up to 5% excess of a stoichiometric amount based on a formation of $SnS_2$.

4. The method of claim 1 wherein the carbon comprises graphite.

5. The method of claim 1 wherein the carbon is selected from the group consisting of a synthetic carbon and a carbon black.

6. The method of claim 1 wherein the carbon is present in the mixture in an amount of 2 wt % to 8 wt % of the mixture.

7. The method of claim 1 wherein the temperature is between 800° C. and 1200° C.

8. The method of claim 1 wherein the step of heating comprises heating for a period of between 0.1 hours to 6.0 hours.

9. The method of claim 8 wherein the step of heating is performed under an inert atmosphere.

10. The method of claim 1 wherein the reaction product predominantly comprises $SnS_2$.

11. The method of claim 1 further comprising cooling the reaction product and grinding the cooled reaction product to form a ground reaction product.

12. The method of claim 11 further comprising combining the ground reaction product with a friction liner mixture.

13. The method of claim 12 wherein the friction liner mixture is a brake liner mixture or a clutch liner mixture.

14. The method of claim 1 further comprising combining the reaction product with graphite, zinc sulfide, tin(II)-sulfide, sulfur, and a metal phosphate to produce a solid lubricant combination.

15. The method of claim 14 wherein the solid lubricant combination comprises the reaction product in an amount of between 2 wt % to 50 wt %, the graphite in an amount of between 2 wt % to 40 wt %, the zinc sulfide in an amount of between 2 wt % to 40 wt %, the tin(II)-sulfide in an amount of between 2 wt. % to 30 wt. %, the sulfur in an amount of between 1 wt. % to 5 wt. %, and the metal phosphate in an amount of between 2 wt. % to 40 wt. %.

16. The method of claim 15 wherein the metal phosphate is selected from the group consisting of aluminum phosphate, calcium phosphate, iron phosphate, magnesium phosphate, and zinc pyrophosphate.

17. A reaction mixture for the production of a solid lubricant, comprising:
   metallic tin, sulfur, and carbon;
   wherein the sulfur is present in the mixture in an amount greater than a stoichiometric amount based on a formation of SnS2, and wherein the carbon is present in the mixture in an amount of 0.5 wt. % to 20 wt. % of the mixture; and
   wherein the reaction mixture forms a tin sulfide matrix predominantly comprising SnS2 when the mixture is heated to a temperature of between 200° C. to 1500° C.

18. The mixture of claim 17 wherein the sulfur is present in the mixture in an amount of up to 5% excess of a stoichiometric amount based on a formation of $SnS_2$.

19. The mixture of claim 17 wherein the carbon is present in the mixture in an amount of 2 wt. % to 8 wt. % of the weight of the mixture.

20. The mixture of claim 17 wherein the carbon comprises graphite.

* * * * *